June 3, 1969
H. J. MUMMA
3,447,659
ALIGNING MECHANISM
Filed Oct. 4, 1967
Sheet 2 of 2
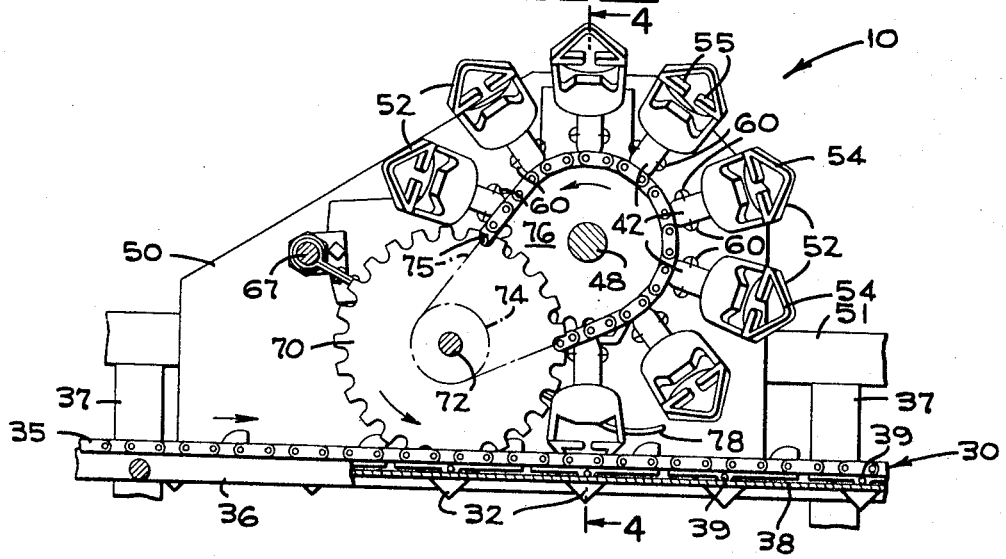
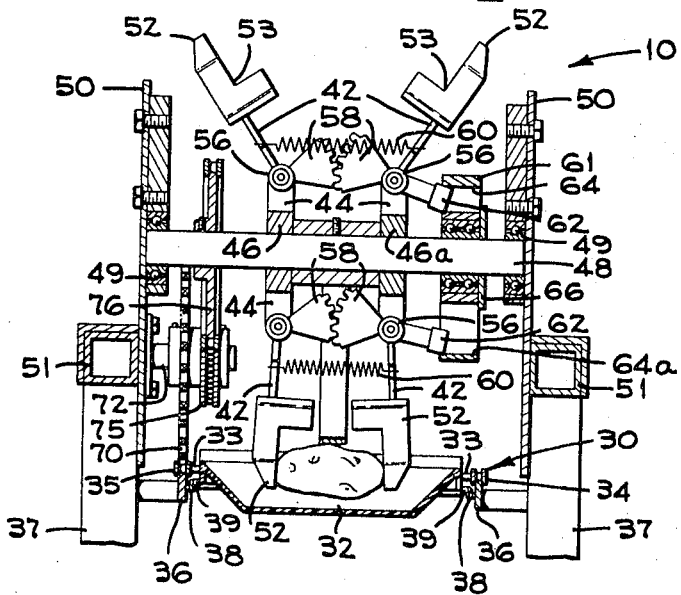
INVENTOR.
HAROLD J. MUMMA
BY F. W. Anderson
C. E. Tripp
ATTORNEYS

United States Patent Office 3,447,659
Patented June 3, 1969

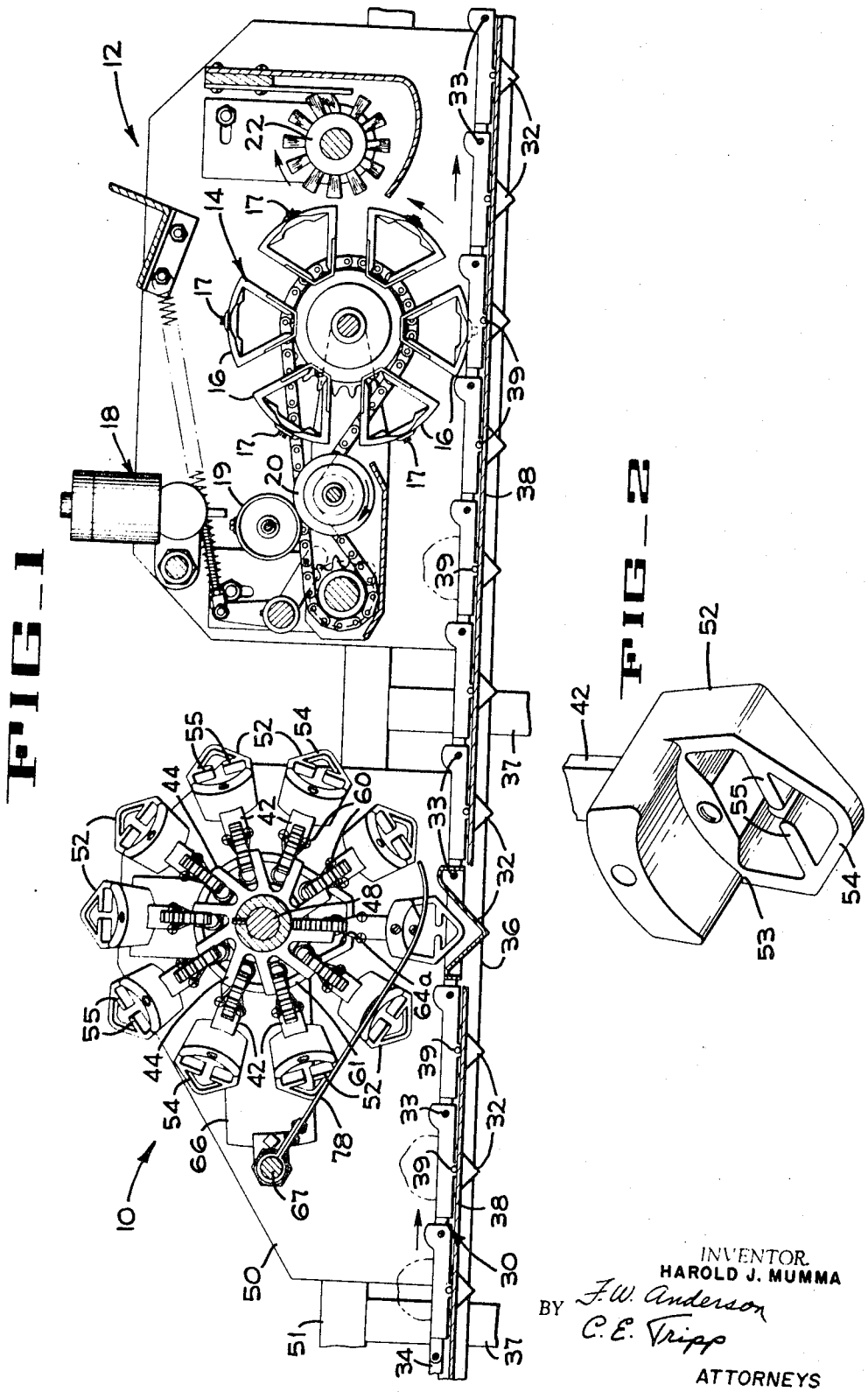

3,447,659
ALIGNING MECHANISM
Harold J. Mumma, Riverside, Calif., assignor to FMC Corporation, San Jose, Calif., a corporation of Delaware
Filed Oct. 4, 1967, Ser. No. 672,889
Int. Cl. B65g 47/22, 47/44; B41f 17/00
U.S. Cl. 198—29
6 Claims

ABSTRACT OF THE DISCLOSURE

An apparatus for centering potatoes within the transversely extending troughs of a continuously moving conveyor. A plurality of sets of opposed arms are pivotally attached about the periphery of a rotating wheel that is mounted above the conveyor with the arms of each set being urged inwardly toward each other as they are rotated directly over the conveyor to push a potato laterally along its supporting trough and to retain it in the center thereof.

CROSS-REFERENCE TO RELATED APPLICATION

The present invention concerns a mechanism disclosed but not claimed in the pending United States patent application of Kalmar and Mumma, Ser. No. 645,799, filed June 13, 1967, which application is assigned to the assignee of the present invention and which is incorporated by reference into the present disclosure for a further description of details of an operative environment for the present invention.

BACKGROUND OF THE INVENTION

Field of invention

In general, this invention concerns apparatus for arranging articles upon a conveyor into a single row, and more particularly, it concerns apparatus for aligning fruit or vegetables of varying sizes and shapes upon a conveyor.

Description of prior art

In performing certain operations upon fruit or vegetables during their initial processing, it is often necessary that the individual articles of fruit be placed in a single row at uniformly spaced intervals and properly aligned so that they can be singularly fed to the processing machinery. The aligning function poses many problems with regard to fruits or vegetables since the normal bulk supply contains fruit of diverse shapes and sizes, and the apparatus for performing the aligning function must be readily adaptable to handle a wide range of sizes as well as some highly irregular shapes.

One of the simplest means of aligning a continuously moving series of articles that have been spaced upon a conveyor is the use of an angled guide member such as is shown, for example, by the patent to Carter 2,690,251. Such an expedient has been found to work well when handling cans or other uniformly sized articles, but it presents many difficulties when called upon to handle non-uniform articles such as fruit or vegetables. Proper alignment of the very large or the very small sizes is particularly difficult to achieve with a simple guide-bar device. Another disadvantage of this simplified apparatus is its failure to function properly at the high speeds required by commercial processing lines.

Another method of aligning a series of fruits is to pass the fruit between a pair of flexible rotary guiding members such as shown, for example, in the patent to Albertoli 2,524,248. However, this apparatus is generally useful only for uniform articles or articles that will vary in size only within a narrow range.

In handling potatoes, the problems associated with the aforedescribed prior art devices become all too apparent since a normal run of potatoes will encompass a great variation in sizes as well as potato shapes ranging from the greatly elongated to the almost spherical.

SUMMARY OF THE INVENTION

The present invention comprises apparatus for aligning fruit or vegetables which have been singulated and placed in uniformly spaced positions upon a continuously moving conveyor. The apparatus of the present invention is specifically designed to operate where the individual fruits or vegetables are received in pockets, such as individual conveyor buckets or troughs, or in the space between adjacent rollers of a roller conveyor.

The aligning apparatus of the present invention comprises a rotary structure which is mounted above the fruit carrying conveyor and which includes a plurality of pairs of opposed arms which are pivotally mounted about the periphery thereof. The opposed arms, which carry flexible fruit or vegetable engaging members at their outer ends, are urged inwardly when they are rotated into the position directly over the conveyor so that they will engage the fruit or vegetable which is received in a pocket upon the conveyor and slide it laterally along that pocket and into the properly aligned position. The timing between the continuously moving conveyor and the continuously rotating aligning structure is such that each fruit carrying pocket that passes beneath the structure will be associated with a pair of opposed arms which are arranged to be moved into alignment therewith to center the article of fruit on the conveyor as it passes beneath the aligning structure.

Since the arms are provided with flexible engagement members, the structure is capable of handling a wide variety of fruit sizes and shapes. The structure is also capable of operation at high commercial processing speeds of from 200 to 300 fruit per minute.

BRIEF DESCRIPTION OF THE DRAWINGS

FIGURE 1 is a longitudinal section through the aligning mechanism of the present invention illustrating its use in connection with a potato marking apparatus with the underlying conveyor for carrying the potatoes being shown in full.

FIGURE 2 is an enlarged detail view of one of the flexible heads of the aligning mechanism shown in FIGURE 1.

FIGURE 3 is a side elevation of the aligning mechanism shown in FIGURE 1 particularly illustrating the drive connection from the conveyor.

FIGURE 4 is a central transverse section through the aligning mechanism taken along the lines 4—4 of FIGURE 3 particularly illustrating the position of the aligning heads when centering a potato upon the conveyor.

The aligning apparatus 10 of the present invention will be described as it is utilized in conjunction with a potato marking device 12 although it will be understood that the apparatus is not limited to use in this capacity. The potato marking device (FIG. 1) generally comprises a marking wheel 14 which includes a plurality of marking dies 16 spaced about the periphery thereof with each die carrying a plurality of needles 17 arranged in the pattern of the desired indicia to be applied to the potatoes. Ink is supplied to the needles by means of an ink pump 18 and transfer rollers 19 and 20 and the needles are cleaned during operation of the apparatus by means of a rotary brush 22. The marking wheel is continuously driven so that each marking die will be caused to engage and mark a potato carried by a continuously driven conveyor 30 passing beneath the wheel.

Each potato must be centered upon the conveyor 30 so that it can be properly marked, and it is the function of the aligner 10 to perform this operation. The conveyor, in the presently described embodiment, comprises a plurality of plastic troughs 32 of generally V-shaped cross section which are attached at their lateral leading edges by means of pins 33 to a pair of longitudinally extending conveyor chains 34 and 35. The conveyor chains are continuously driven during operation of the apparatus (by conventional drive means, not shown) and are supported upon longitudinally extending rails 36 that are attached to upstanding posts 37 spaced along the length of the apparatus. Each of the rails 36 supports an inwardly extending flange 38 which is positioned adjacent to the lateral edge of the trough and serves to support a projecting pin 39 attached to the central side portion of the trough so that each trough will be maintained in a horizontal position for transporting potatoes.

Other types of conveyors could easily be substituted for the aforedescribed conveyor even when the aligning mechanism of the present invention is used to align potatoes. For example, a conventional roller conveyor may be used where the potatoes, or other fruits or vegetables, are received between adjacent rollers and may be slid laterally for alignment. The only requirements of the conveyor are that it is one whereby the fruits or vegetables are received in longitudinally uniformly spaced positions so that the timing between the aligner and conveyor can be set and that the conveyor structure be such that the fruits or vegetables may be readily shifted laterally by the aligning mechanism.

The function of the aligner 10 is to place each potatao in the center of a conveyor trough 32 so that it will be in the proper position for engagement by the marking apparatus 12, as explained hereinbefore. The aligner generally comprises a plurality of pivotally mounted arms 42 which are arranged in opposed pairs that are adapted to be swung together to push the potato into the center of a trough. Each arm 42 is rotatably mounted upon projecting spokes 44 of a pair of hubs 46 and 46a that are secured together and keyed to a drive shaft 48 which is rotatably mounted in bearing blocks 49 at the side of the apparatus. The bearing blocks are adjustably mounted upon side plates 50 which are carried by tubular frame members 51 extending parallel to the conveyor 30 and being supported by the upstanding posts 37.

Fastened to the outer end of each arm 42 is a flexible head 52 (FIG. 2), of rubber or rubberlike material and of generally tubular shape, which is cut away at the outermost portion 53 of its inner face for yieldable engagement with the small end of a potato. The recessed portion 53 includes a potato-engaging face comprised of a narrow outer wall 54 and a pair of oppositely projecting flexible ribs 55.

The inner ends of the arms 42 that carry the flexible heads are attached to hubs 56 which are rotatably mounted upon the adjacent spokes 44 and carry gear segments 58 which project laterally inwardly of the arms 42. The gear segments of each of the oppositely positioned arms 42 have inter-engaging teeth so that each set of arms will be moved inwardly and outwardly together, and a tension spring 60 is fixed to each of the oppositely positioned arms to continuously urge them toward their innermost position.

The opposed arms 42 are normally forced outwardly by a cam 61 which is rotatably mounted upon the drive shaft 48. Each of the arms 42 which are mounted upon the hub 46a at the right-hand side of the apparatus (as viewed in FIG. 4) include cam followers 62 which are attached to the hubs 56 at the inner end of the arms and which project laterally in a direction opposite to that of the associated gear segments 58. The cam followers are arranged to ride in a cam track 64 on the face of the cam which is welded to a support arm 66 that is secured to a laterally extending, fixed shaft 67 mounted between the side plates 50.

The aligner 10 is continuously driven by means of a sprocket 70 which is rotatably mounted upon a stub shaft 72 affixed to one of the side plates 50 and is positioned to be engaged by the drive chain 35 of the conveyor 30. Rigidly attached to the inner side of the sprocket 70 is a smaller sprocket 74 (FIG. 3) which is also rotatably supported upon the stub shaft 72 and which drives a chain 75 that is trained about a sprocket 76 which is keyed to the aligner drive shaft 48.

It will be apparent that continuous movement of the conveyor chain 35 will cause the drive shaft 48 to be rotated and the cam followers 62 to move about the cam track 64. The shape of the cam track, as best seen in FIGURE 1, has the effect of forcing the opposed pairs of arms 42 apart during the major portion of their rotation about the axis of the shaft 48. However, when the opposed arms descend near to their lowermost position the cam track 64 is widened at 64a (FIG. 1) and the interconnecting springs 60 pull the opposed arms together to thus laterally center a potato within an associated trough 32. As stated hereinbefore, the heads 52 on the arms are made of a highly flexible and yieldable rubberlike material so that the potatoes will not be damaged thereby. In the case of extremely long potatoes, the heads 52 are capable of being compressed and folded outwardly so as to ride over the top of the potato.

A thin metal strap 78 is yieldably mounted upon the transverse shaft 67 and extends along the center line of the aligner with its lowermost end resting just above the conveyor trough that is directly beneath the aligner structure. This strap keeps the potatoes in the troughs when they are slapped by the flexible heads 52 and is particularly effective in preventing the small and light potatoes from being knocked into an adjacent trough or laterally off the conveyor. While the natural resilience of the metal strap will permit it to flex to a certain extent, it may be desirable to use a conventional spring mounting for the end of the strap which is secured to the shaft 67 to allow for greater flexibility.

From the foregoing description of the aligner of the present invention, it will be evident that it is capable of general usage in the fruit or vegetable processing industries since it can readily be adapted to handle different forms of products on different types of conveying systems. The device, although simple in concept, has been found to be extremely effective in operation and capable of performing at high commercial speeds.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. Apparatus for aligning fruit or vegetables of varying sizes and shapes upon a continuously moving conveyor wherein said conveyor includes a plurality of uniformly spaced parallel pockets extending transversely of the conveyor, said apparatus comprising a wheel rotatably mounted above said conveyor, a plurality of arms pivotally mounted upon said wheel, said arms being arranged in opposed relationship in pairs angularly spaced about the periphery of the wheel with the arms of each pair being pivotally mounted for movement toward or away from each other, flexible means at the outer end of each of said arms for engagement with a fruit or vegetable on the conveyor, means for rotating said wheel in timed relationship with the movement of said conveyor whereby successive pockets on said conveyor are received directly beneath successive pairs of arms on said wheel, and means for successively moving the arms of each pair toward each other when the arms are positioned directly over the conveyor so as to move a fruit or vegetable laterally along its pocket and into an aligned position upon the conveyor.

2. Apparatus for aligning fruit or vegetables according to claim 1 including cam means for moving the arms of each pair apart during that portion of their orbital movement when they are not positioned directly above said conveyor, said means for successively moving the arms of each pair toward each other comprising a tension spring connected between said arms.

3. Apparatus for aligning fruit or vegetables according to claim 2 including interengaging gear segments attached to the inner end of each of the pivotally mounted arms.

4. Apparatus for aligning fruit or vegetables according to claim 1 wherein said flexible means at the outer end of said arms comprises a member of rubber-like material having a recessed portion therein, each of said members being positioned so that the recessed portion faces its opposed member.

5. Apparatus for aligning fruit or vegetables according to claim 4 wherein said recessed portion includes a tubular cavity having reinforcing ribs extending transversely therewithin.

6. Apparatus for aligning fruit or vegetables according to claim 1 including a yieldable strap mounted directly over said conveyor between the lowermost pair of opposed arms for engagement with the fruit or vegetable within a conveyor pocket in order to aid in maintaining its alignment upon the conveyor.

References Cited

UNITED STATES PATENTS 2,771,176   11/1956   Clark _____ 198—29

EDWARD A. SROKA, Primary Examiner.

U.S. Cl. X.R.

101—35; 198—167